July 15, 1924.  
H. B. TAYLOR  
FLUID PRESSURE CONTROL SYSTEM  
Filed Jan. 21, 1919 3 Sheets-Sheet 2
1,501,147
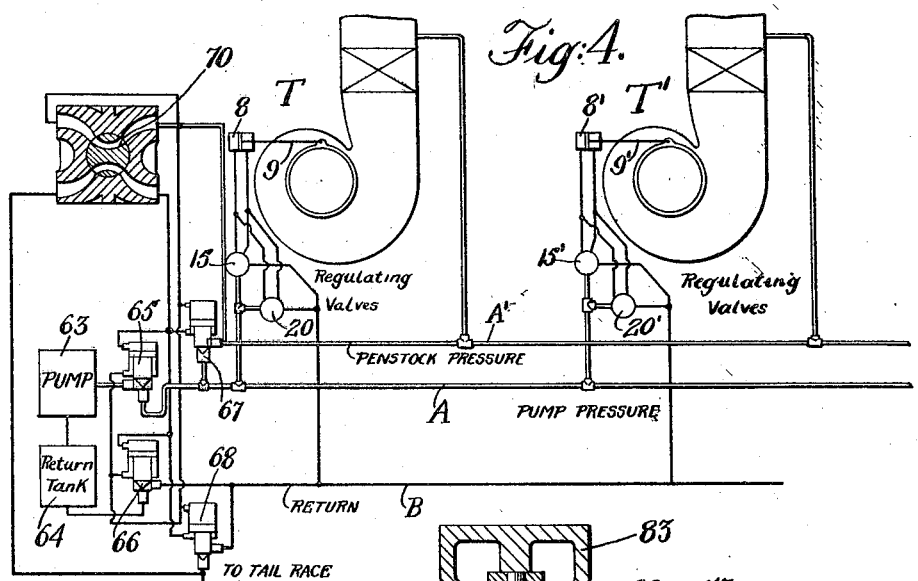
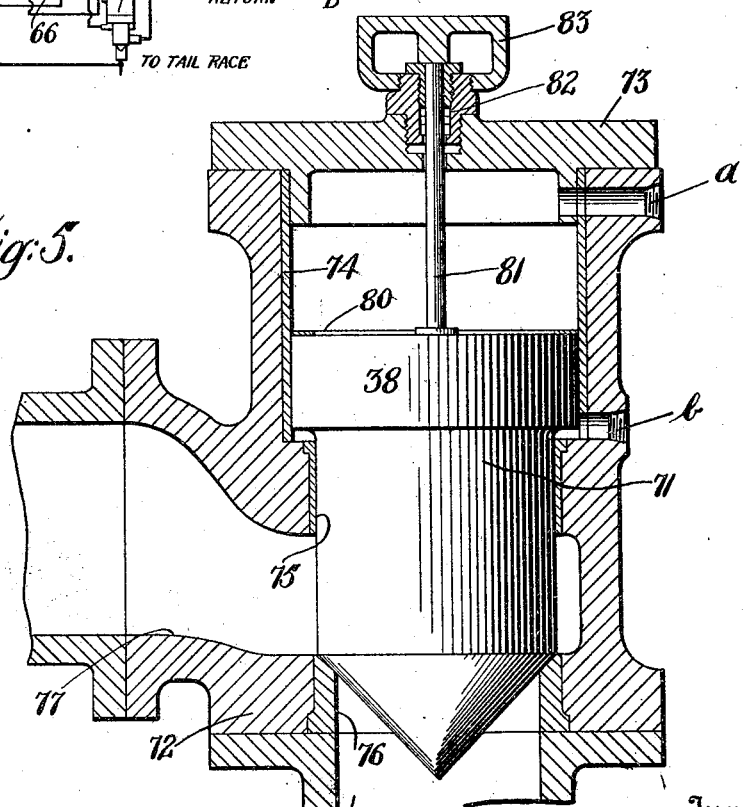

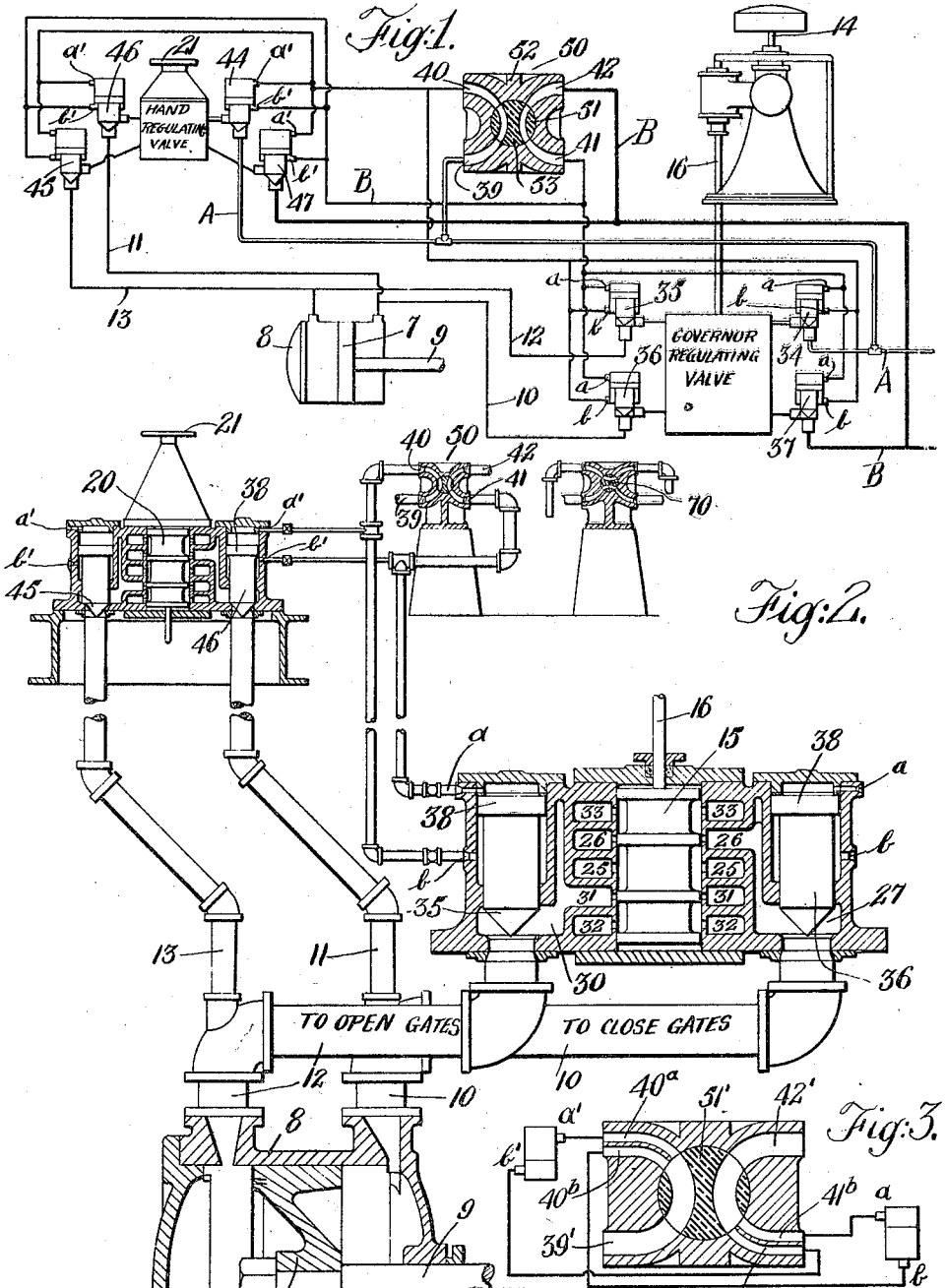

July 15, 1924.

H. B. TAYLOR

FLUID PRESSURE CONTROL SYSTEM

Filed Jan. 21, 1919   3 Sheets-Sheet 3

1,501,147

INVENTOR
H. Birchard Taylor
BY
Edwards, Sager & Bower
ATTORNEYS

Patented July 15, 1924.

1,501,147

UNITED STATES PATENT OFFICE.

HARVEY BIRCHARD TAYLOR, OF PHILADELPHIA, PENNSYLVANIA.

FLUID-PRESSURE CONTROL SYSTEM.

Application filed January 21, 1919. Serial No. 272,381.

*To all whom it may concern:*

Be it known that I, HARVEY B. TAYLOR, a citizen of the United States, residing at Philadelphia, in the county of Philadelphia and State of Pennsylvania, have invented certain new and useful Improvements in Fluid-Pressure Control Systems, of which the following is a specification.

This invention relates to fluid operated valves and a method of controlling the same.

In the control of hydraulic turbines it is customary to automatically regulate the supply of water according to the load and to take care of other than ordinary load conditions or the failure of the automatic regulation by an alternative hand regulation. Both of these regulations utilize an intermediate power drive to move the supply gate and when one regulation is being used, the other must be shut off. During a shift from one to the other, as hitherto effected by hand operated regulating valves, there is a dangerously prolonged interval when neither regulation is effective. Attempts to co-ordinate the opening and closing movements of these regulating valves to reduce this interval lead to further difficulties. For example in the installation of the plant in order to bring the respective valves near together for closely timed operation they must all be located together on the same floor and require long connections to the controlled parts on other floors or long extensions passed through the floors from one regulating means to the other, thus leading to troublesome and expensive limitations on the design of the turbine and auxiliary apparatus. Again this manual operation of the regulating valves is difficult, requiring great effort and a high degree of skill and even under the best conditions regulation is lost for a considerable interval of the time during which the turbine is liable to serious injury in the event of a sudden change in load.

According to my invention I provide means for power operation of the regulating valves, whereby the control thereof may be effected from any convenient point irrespective of the layout of the plant, and whereby the change from one form of regulation to the other will be accomplished simply and certainly and by means of apparatus not requiring the high degree of skill heretofore necessary. The invention also embodies other features of advantage which will more fully appear hereinafter.

In the accompanying drawings:

Fig. 1 is a diagrammatic development of the system shown in Fig. 2;

Fig. 2 is an elevation with parts in section of apparatus embodying this invention;

Fig. 3 is a section of a modified form of control valve;

Fig. 4 is a diagram of another part of the control system utilizing this invention, Fig. 5 is a vertical section of a pressure operated valve of this invention.

Figure 6:
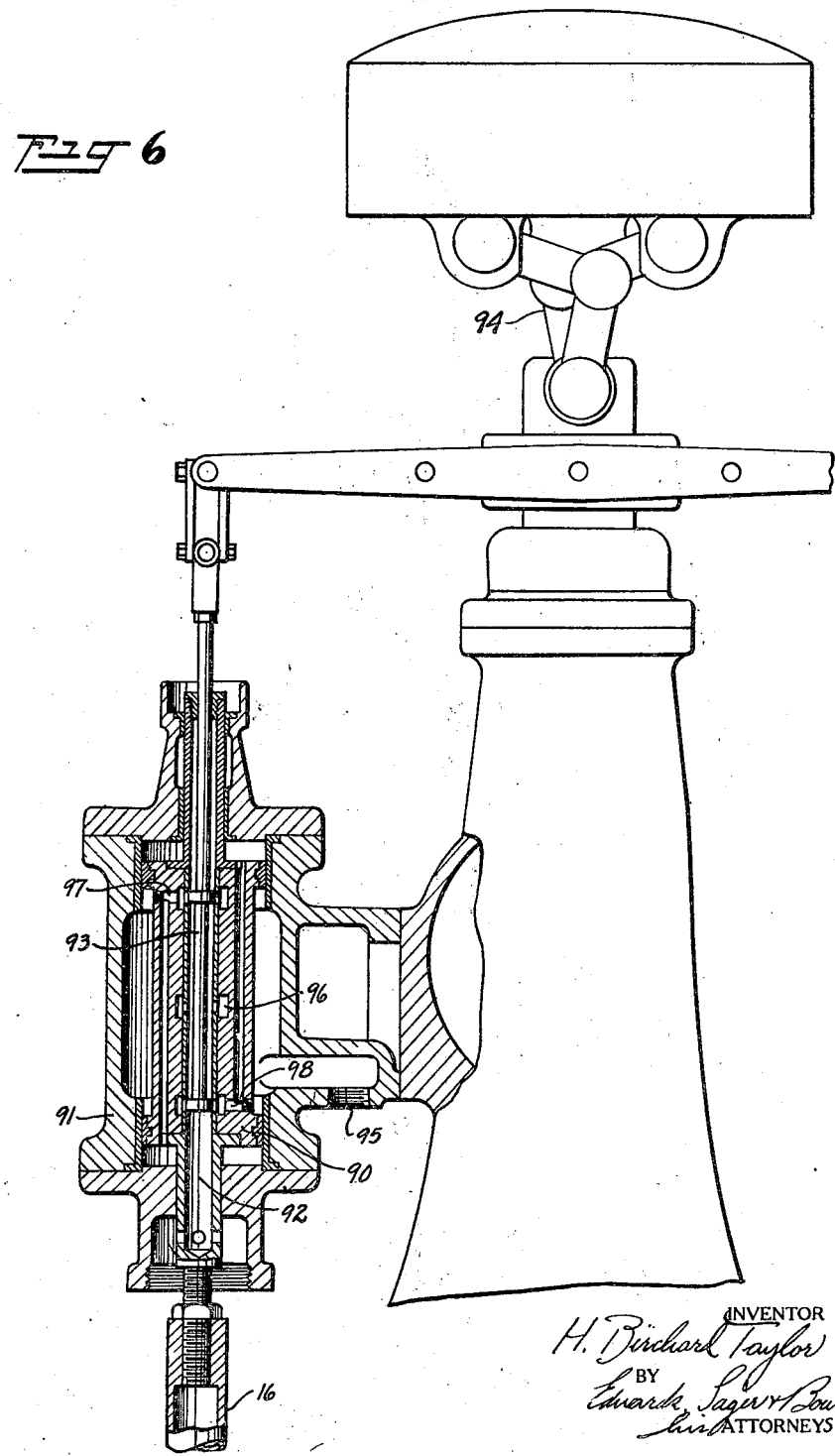
Fig. 6 is an enlarged view of a portion of the governor shown in Fig. 1.

In the drawings a piston 7 in cylinder 8 has its rod 9 connected to the inflow gate of a hydraulic turbine T (see Fig. 4) so that movement of the piston to the right opens the gate and to the left closes it. To move the piston, fluid under pressure is admitted to the cylinder 8 through pipes 10 or 11 to close the gate or through pipes 12 or 13 to open the gate. To regulate the position of the piston and the gates there are provided the automatically operated regulating valve 15 controlling the flow through pipes 10 and 12, and the hand operated regulating valve 20 controlling the flow through pipes 11 and 13.

The automatically operated regulating valve 15 is connected by rod 16 to an automatic governor 14 usually of the centrifugal type driven from the turbine shaft. Rod 16 is connected to and operated by a piston 90 located in the governor cylinder 91. The piston 90 is formed with a central bore 92 in which operates the pilot valve 93 connected to and operated by the centrifugal device 94. Cylinder 91 is provided with a port 95 for supplying fluid pressure to the cylinder and when the pilot valve is raised relative to the piston 90 fluid pressure is admitted to the bottom of the cylinder through ports 96 and bore 92 and at the same time the space above the piston is placed in communication with the outlet through port 98. This raises the piston 90 and its connected rod 16. When the pilot valve 93 is lowered relative to the piston 90 fluid pressure is admitted to the space above the piston and the space below the piston is connected to the outlet and the piston and rod are moved downward. As the load lightens and the turbine speeds up beyond a predetermined mean, the valve 15 is raised by the governor 14 to admit fluid from pressure chamber 25 through port 26, chamber 27 and pipe 10 to move the piston 7 and supply gate toward closed position; at the same time fluid is discharged from the other side of the piston 7 through pipe 12 chamber 30, port 31 and exhaust chamber 32. Conversely as the load increases the valve 15 is lowered to connect pressure chamber 25 with port 31 chamber 30 and pipe 12 to move the piston 7 and the supply gate toward open position while fluid is discharging through pipe 10, chamber 27, port 26 and exhaust chamber 33. The hand operated regulating valve 20 operates similarly to regulate the inflow and outflow through pipes 13 and 11, but the valve is moved manually by means of hand wheel 21.

The automatically governed and the hand operated regulations are alternative and during the shift from one to the other it is highly desirable to keep the turbine in operation and to avoid interruption of the regulation. It is also desirable that the control for the shift shall be independently placeable with relation to the regulating means so that this shift control and the automatic and hand regulating valves may be most advantageously placed in the installation.

In the embodiment of this invention illustrated in Fig. 2 the shift from one regulation to the other is accomplished by means of the fluid pressure used to actuate the supply gate and the system is such that complete control of the shift is centered in a single valve 50. When this valve is turned one of the gate regulating means is thrown out and the other in, the change being practically instantaneous; and the control valve 50 itself may be conveniently located remote from any of the apparatus it controls. For example in Fig. 2 the automatic regulating valve 15 is on a lower level close to the operating cylinder 8 for the turbine gate while the hand operated regulator 20 and the shift control valve 50 are on a single upper floor with the generator and the governor for the automatic regulator.

To provide the remotely controlled power operated means for effecting the shift the regulators are provided with fluid operated valves for shutting off the fluid pressure from either regulator and correspondingly giving it access to the other. In the system shown in diagram Fig. 1 four of these shift valves are shown in connection with each regulator. Valve 34 intervenes between fluid pressure supply A and the pressure chamber 25 (see Fig. 2) of the automatic regulator and valve 44 of the hand operated regulator is similarly placed, while valves 37 and 47 are between the exhaust chambers 32, 33 of the regulators and the exhaust piping B. Valves 34, 44, 37 and 47 do not appear in Fig. 2, being in different planes from the sections shown. Valves 35 and 45 control the connections to the head end of the cylinder 8 to open the gate and valves 36 and 46 control the connections to the piston end of the cylinder 8 to close the gate. Each of these valves is provided with a cylinder and a piston member 38 therein actuated by fluid pressure to close the valve by pressure admitted above the piston $a$, $a'$ and open the valve by pressure admitted below the piston at $b$, $b'$. To shift from one regulator to the other the fluid pressure operated valves corresponding to the former are closed and the valves corresponding to the other are opened and to make the change substantially instantaneous and simultaneous all the shift valves are operated from the single control valve 50, of the double throw type. One port 39 of this valve is connected to a source of fluid pressure and another 42 to an exhaust; the port 40 is connected to the shift valves of the hand operated regulator at $a'$ and to the shift valves of the automatic regulator at $b$ while the port 41 is connected to the opposite ports $b'$ and $a$ of the hand and automatic regulators respectively. The plug 51 of valve 50 has passages 52 and 53 which in the position shown in Fig. 1 connect ports 39 and 40, and 41 with 42 to close the shift valves of the hand regulator and open those of the automatic. When rotated through 90° these passages 52, 53 connect ports 40 with 42 and 41 with 39 to close the shift valves of the automatic and open those of the hand regulator. Both sets of valves open or close simultaneously and the shift is nearly instantaneous so that the control is practically uninterrupted.

It may be desirable to begin the closing movement of either set of valves in advance of the opening of the other or vice versa, or to operate the valves in a predetermined sequence. One way of providing for this is by rearrangement of the valve ports as shown in Fig. 3, where separate ports 40$^a$ and 40$^b$ are connected respectively to the shift valves of the hand operated regulator at $a'$ and of the automatic regulator at $b$, while ports 41$^b$ and 41$^a$ are connected respectively to the shift valves of the hand operated regulator at $b'$ and of the automatic regulator at $a$. In the position of the valve plug 51' shown the shift valves of the hand operated regulator are closed and those of the automatic are open, and by turning the plug 50' in either direction their conditions will be reversed. If the plug is turned clockwise the shift valves of the automatic regulator will begin their movement ahead of those of the hand operated regulator and vice versa if the plug is turned counterclockwise. Similarly the plug 51' may be returned to the position shown by clockwise or counterclockwise rotation advancing one or the other of the sets of shift valves. The plug 51 may be operated so that the shifts will still overlap and be substantially simultaneous or the shift valves may be fully operated in predetermined sequence. The ports may be differently connected to the valves and ports may be added to operate the other valves in sequence. In any arrangement the change is accomplished much more expeditiously than with hand operated shift valves.

Combined with this control of the shift from one regulator to another the system of this invention as shown in Fig. 4 also includes a control of the source of the fluid pressure utilized. When the turbines T, T' and the regulators 15, 20 and 15' 20' are used it is desirable normally to furnish fluid under pressure for the regulators from a power driven pump 63 through piping A. The return fluid from each regulator is connected to the common return or exhaust main B which leads to a return tank 64 to which the suction of the pump 63 is connected. In case of trouble with the pump causing loss of pressure on the regulating and shift control it is desirable to operate the governors from the pressure in the penstock by means of the penstock main A' and to have control of the change from pump to penstock pressure at a point near the other controlling elements which often require operation at this time. Fluid pressure operated valves 65 and 66 are therefore provided closing to shut off the pump 63 and the tank 64 from the pressure and exhaust lines A and B respectively; and cooperating fluid pressure valves 67 and 68 open to connect the main A' to the pressure line A and to discharge the exhaust line B to the tail race. Reverse operation of the valves 65, 66, 67 and 68 is of course required to return to the use of pump pressure and these valves are fluid pressure operated and controlled by a central reversible distributing valve 70 in a manner similar to the control by valve 50. In one position the central valve 70 will close the fluid pressure operated valves 67 and 68 and open valves 65 and 66. In another position central valve 70 will open the valves 67 and 68 and close valves 65 and 66. The valve 70 may be located at any desired place remote from the controlled valves and is preferably placed near the hand wheel 21 and valve 50 as shown in Fig. 2. It may receive its pressure supply from the pressure main A as shown in the case of valve 50 in Fig. 1 or be permanently connected to the penstock and tail race as indicated in Fig. 4, to surely avoid failure of operating pressure.

Throughout the system of this invention the fluid pressure operated valves, in order to utilize the fluid pressure of the mains they are closing or opening, must be such as to be surely and quickly operated by a fluid pressure equal to or even less than that against which they close. Figure 5 shows a cross section view taken through the center line of one of these valves. 71 is the plunger of the differential type, that is the top portion 38 of the plunger is larger in diameter than the bottom portion. 72 shows the valve body having side inlet at 77 and axial discharge at 78 or vice versa. 73 is a cover on top of the valve body. 74 and 75 are liners in valve body for guiding plunger 71. 76 is a liner in the valve body to act as a seat when the plunger is closed.

Openings a, b are connections for admitting or releasing fluid pressure. To close the valve, pressure is admitted at upper opening a and released at lower opening b. To open the valve, pressure conditions are reversed. Packing ring 80 is secured to top of the plunger to form a seal when the valve is open and prevent leakage around the upper piston portion of plunger. Rod 81 is attached to the top of the plunger and extends through a stuffing box 82 to act as an indicator to show the position of the plunger. Cap 83 is screwed down on top of stuffing box 82 when it is desired to lock the plunger is a closed position.

As shown in Fig. 2, the structure of the fluid pressure operated valves permits them to be readily combined with the regulating valves and to have their casings cast integral in a strong and compact manner. The radial and axial ports also enable these valves to be fitted with other structures (see Figs. 2 and 5).

By the system of this invention all the elements of the regulating system are under quick and certain control. The control parts to be operated are all conveniently located in juxtaposition so that one operator can manipulate them or different operators can each know what the others are doing. The power operated valves receive their power conveniently from the regulating system itself, and their proper operation does not require the high degree of skill hitherto necessary to accomplish their results.

While in Fig. 1 four fluid operated valves for each regulation are shown, in many cases it is possible to omit one or more of these plunger valves—for instance the valves 37 and 47 connecting the regulator valves to the exhaust. It is also to be understood that the invention is not confined to a particular form of regulating valves 15 and 20, nor to the specific combination of parts shown and described, but is intended to cover such modifications as fall within the scope of the appended claims.

I claim:—

1. In a regulating system for a hydraulic turbine, a plurality of control valves, means for closing certain of said valves and opening others, and a single operating valve controlling said means.

2. In a regulating system for a hydraulic turbine, a plurality of control valves, means for closing certain of said valves and opening others substantially simultaneously, and a single operating valve controlling said means.

3. In a regulating system for a hydraulic turbine, the combination with hand operated regulating means, and automatically operated regulating means, of power operated means for rendering one of said regulating means effective and the other ineffective.

4. In a regulating system for a hydraulic turbine the combination with hand operated regulating means, and automatically operated regulating means, of power operated means for rendering one of said regulating means effective and simultaneously rendering the other regulating means ineffective.

5. In a regulating system for a hydraulic turbine the combination with hand operated regulating means, and automatically operated regulating means, of fluid operated means for rendering one of said regulating means effective and simultaneously rendering the other regulating means ineffective.

6. In a regulating system for a hydraulic turbine the combination with hand operated regulating means, and automatically operated regulating means, of fluid operated valves for rendering one of said regulating means effective and simultaneously rendering the other regulating means ineffective.

7. In a regulating system for a hydraulic turbine the combination with hand operated regulating means, and automatically operated regulating means, of power operated means for rendering one of said regulating means effective and simultaneously rendering the other regulating means ineffective and a single means for controlling said power operated means.

8. In a regulating system for a hydraulic turbine the combination with hand operated regulating means, of automatically operated regulating means, fluid operated valves for rendering one of said regulating means effective and simultaneously rendering the other regulating means ineffective and a single valve for controlling said fluid operated valves.

9. In a regulating system for a hydraulic turbine the combination with hand operated regulating means, and automatically operated regulating means, of fluid operated means for rendering one of said regulating means effective and rendering the other regulating means ineffective.

10. In a regulating system for a hydraulic turbine the combination with hand operated regulating means, and automatically operated regulating means, of fluid operated valves for rendering one of said regulating means effective and rendering the other regulating means ineffective.

11. In a regulating system for a hydraulic turbine the combination with hand operated regulating means, and automatically operated regulating means, of power operated means for rendering one of said regulating means effective and rendering the other regulating means ineffective and a single means for controlling said power operated means.

12. In a regulating system for a hydraulic turbine the combination with hand operated regulating means, of automatically operated regulating means, fluid operated valves for rendering one of said regulating means effective and rendering the other regulating means ineffective and a single valve for controlling said fluid operated valves.

13. In a regulating system for a hydraulic turbine, the combination with hand operated regulating means and automatically operated regulating means, of fluid operated means for rendering one of said regulating means effective and rendering the other regulating means ineffective, and a single means for controlling said fluid operated means.

14. In a regulating system for hydraulic turbines, the combination with regulating means utilizing fluid pressure, of fluid pressure operated valves controlling the supply of fluid pressure to said regulating means, and a single means for actuating said valves to control selectively the supply to said regulating means.

15. In a regulating system for hydraulic turbines, the combination with regulating means utilizing fluid pressure, of fluid pressure operated valves controlling the supply of fluid pressure to said regulating means, said regulators and said valves having the same sources of fluid pressure, and a single means for actuating said valves to control selectively the supply to said regulators.

16. In combination with a hydraulic turbine, a source of fluid pressure, a plurality of alternative devices to utilize said fluid pressure, control valves for controlling said devices, and means for operating said control valves by said fluid pressure.

17. In a regulating system for a hydraulic turbine the combination with a governor proper, comprising a cylinder and a fluid pressure operated piston therein, of a regulating valve located separately from the governor, means responsive to said regulating valve for controlling the flow of fluid through said turbine and a rod moved by said piston and serving to transmit the motion thereof, to said separately located regulating valve.

18. In a system for the supply of pressure fluid for regulating a hydraulic turbine, the combination with hand operated and automatic regulating valves, of power operated control valves, having casings cast integral with said regulating valves and a relatively remote control means for actuating said control valves from a distance.

19. In a regulating system for a hydraulic turbine, the combination with hand operated and automatic regulating valves, of power operated control valves, having casings cast integral with each other and a relatively remote control means for actuating said control valves from a distance.

20. The combination with a hydraulic turbine and a plurality of sources of fluid pressure, of fluid pressure operated valves actuated thereby, and a remote control valve for controlling the operation of said valves to shift from one source of fluid pressure to another.

21. The combination with a hydraulic turbine and a plurality of sources of fluid pressure and regulating means actuated thereby of fluid pressure operated valves for shifting from one source of fluid pressure to another, and a hand operated valve forming a remote control for said fluid pressure operated valves.

22. In a regulating system for a hydraulic turbine, automatic regulating means operable throughout a given range and remotely operated means constructed and arranged to regulate said turbine throughout substantially the same range to the exclusion of said automatic means, said remotely operated means comprising a source of power and means to control power from said source to regulate said turbine and connections between said automatic regulating means and said remotely operated means for shifting the control from one to the other.

23. In a turbine fluid operated means for regulating the same, automatic means for controlling the supply of fluid to said regulating means and hand control means for controlling the supply of fluid to said regulating means to the exclusion of said automatic means.

24. The combination in a turbine regulating system, of a fluid operated device for regulating the turbine, a plurality of separate means for controlling the supply of fluid for said device so as to regulate said turbine and a single means for rendering one only of said separate means effective.

25. The combination in a turbine regulating system, of a device for regulating the turbine, a plurality of separate sources of power for actuating said device to regulate said turbine and remotely controlled means for rendering one of said separate sources available for supplying power to the exclusion of the other of said sources.

26. In a turbine, power operated means for regulating the same, a plurality of sources of power for said regulating means, a plurality of devices for controlling the supply of power, means for rendering one or another of said sources available to supply power to said regulating means and means for rendering one or another of said devices available for controlling the power supply.

27. The combination in a turbine regulating system, of a fluid operated device for regulating the turbine a plurality of mechanically separate and independently operable means for controlling the supply of fluid to said device and a single means for rendering one only of said separate means effective.

28. In a turbine regulating system the combination of turbine gates, an operating cylinder therefor and a control valve for said operating cylinder located near to said gates, remote transmission for operating said valve and a speed responsive governor located at a point remote from said gates for actuating said transmission, said speed responsive governor comprising a speed responsive device and a source of power supply controlled by said device for furnishing the energy to operate said transmission.

29. In regulating mechanism for hydraulic turbines the combination with power operated means for controlling the flow, automatic governing means and hand control means for said power operated means, and means for corelating the movements of said automatic and hand control means so that they are interchangeable without preliminary adjustment of either.

30. In regulating mechanism for hydraulic turbines the combination with power operated means for controlling the flow, automatic governing means and hand control means for said power operated means, and means for corelating the movements of said automatic and hand control means so that they are instantaneously interchangeable without preliminary adjustment of either.

31. In regulating mechanism for hydraulic turbines the combination with power operated means for controlling the flow, automatic governing means and hand control means for said power operated means, and means for corelating the movements of said automatic and hand control means so that they are interchangeable by a movement of a single member without preliminary adjustment of either.

32. In a governing mechanism for a hydraulic turbine, the combination with automatic governing means comprising governor valve mechanism, of hand control means comprising hand operated valve mechanism, and shift means for closing or opening the governor valve mechanism and simultaneously connecting and disconnecting said hand operated valve mechanism.

33. In a governor mechanism for a hydraulic turbine, the combination with gate operating means, of automatic governing means comprising governor valve mechanism, hand controlled means comprising hand operated valve mechanism, and shift means for closing or opening the governor valve mechanism and simultaneously connecting or disconnecting said hand operated valve mechanism with or from said gate operating means.

HARVEY BIRCHARD TAYLOR.